INVENTOR.
JOHN W. PEASE

Oct. 3, 1961  J. W. PEASE  3,002,791
EMERGENCY POWER BRAKE SYSTEM
Filed Nov. 25, 1957  3 Sheets-Sheet 3

INVENTOR.
JOHN W. PEASE
BY
ATTORNEY.

United States Patent Office 3,002,791
Patented Oct. 3, 1961

3,002,791
EMERGENCY POWER BRAKE SYSTEM
John W. Pease, Hartsdale, N.Y., assignor to Midland-
Ross Corporation, a corporation of Ohio
Filed Nov. 25, 1957, Ser. No. 698,551
6 Claims. (Cl. 303—2)

This invention relates to power brake systems for vehicles and more particularly to an improved emergency power brake system.

Power brake systems have been employed for many years on lightweight vehicles such as passenger cars, and on heavyweight vehicles such as trucks, trailers and buses.

In the case of light vehicles a power brake system is a convenience to the driver in avoiding fatigue and improving maneuverability of the vehicle. Actually the vehicle can be satisfactorily braked by manual effort. However, for safety a second or emergency brake system is required to brake the vehicle upon failure of the first brake system which is usually referred to as the service brake. Ordinarily the emergency brake system on light vehicles is manually operated and effective on the rear wheel brakes or on a separate brake acting on the transmission drive shaft. Such emergency brake systems are less expensive than a second service brake system. However, they are also considerably less effective in braking the vehicle and are a compromise between a desired braking effort and a cost factor.

In the case of heavy vehicles the problem is not so simple in that since power braking is not a question of convenience but of actual necessity in that manual means alone are not sufficient to adequately brake the vehicle. Therefore, in heavy vehicles the service brake is power operated and the hand operated emergency brake is of little use except as a parking brake and in this respect is not dependable with a loaded vehicle on a grade in excess of 2%. Since it is impractical and costly to duplicate the service brake system as an emergency braking means, various devices have been proposed and incorporated to safeguard weak links in the system and thereby reduce accidents due to failures in the service brake system.

It is an object of the invention to provide an independent emergency brake system combining minimum cost and maximum braking effort.

A further object of the invention is to provide a power brake system for vehicles deriving its power from the sprung weight of the vehicle through fluid suspension means.

Another object of the invention is to provide an improved power brake system for vehicles in which the available braking effort is proportional to the load on the vehicle.

In another aspect of the invention it is an object to provide an improved power emergency brake system powered by a source of fluid pressure on the vehicle which is normally used to actuate devices other than the brakes.

An additional object of the invention is to provide an improved emergency brake system requiring no fluid or electric lines from the tractor to the trailer in addition to those commonly provided for service brakes and lighting equipment.

A further object of the invention is to provide an improved emergency brake system for vehicles which obtains its power from the sprung weight of the vehicle and is automatically actuated in response to a drop in pressure of the fluid in a separate service brake system below a predetermined pressure.

Another object of the invention is to provide an emergency brake system for a vehicle in which overtravel of a manually operated service brake lever is effective to apply emergency braking effort derived from the sprung weight of the vehicle through a fluid suspension means.

Other objects and advantages of the invention and desirable details of construction and combinations of parts will become apparent from the following description of preferred embodiments, which description is taken in conjunction with the accompanying drawings in which.

Figure 1:
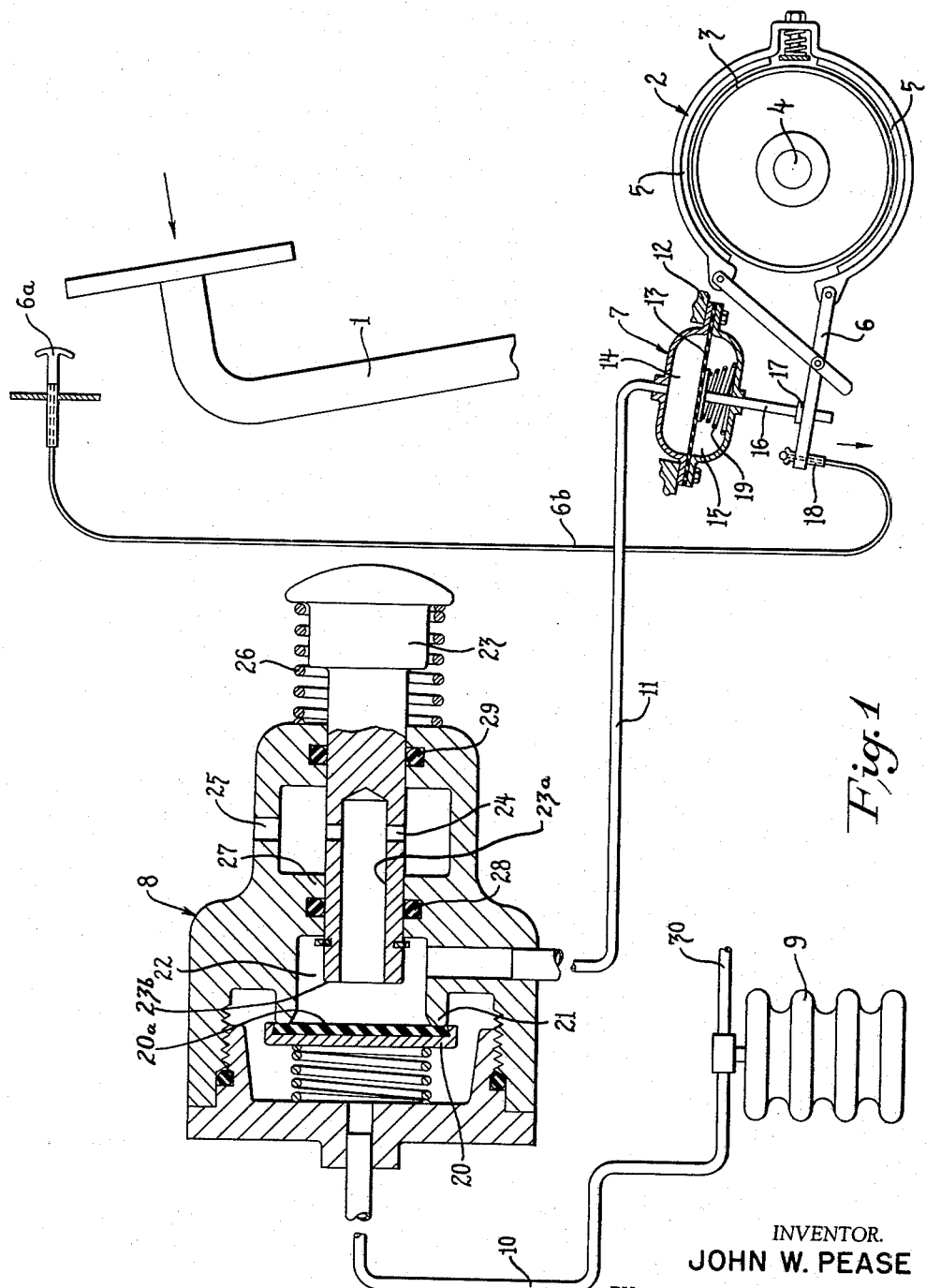
FIG. 1 is a diagrammatic view partly in cross-section of an emergency brake system embodying the invention.

Referring to the drawings and for the moment to FIG. 1, a manually operated foot pedal 1 of a service brake system (not shown) for applying the service brakes of the vehicle is shown in association with a brake system including a brake mechanism 2 comprising a drum 3 fixed to a drive shaft 4 of the vehicle, brake shoes 5 adapted to be pressed against the drum 3 upon downward movement of one end of an arm 6 as indicated by the arrow in FIG. 1. Arm 6 is conventionally operated by a hand brake 6a through suitable cable means indicated at 6b.

While the above described conventional emergency brake system is satisfactory to a limited extent as a parking brake and to lesser extent as an emergency brake, it is not a satisfactory substitute for the manual service brake system to arrest a moving vehicle or to hold a heavily loaded vehicle on a steep incline.

In accordance with the invention provision is made for a differential fluid pressure motor 7 to move the brake mechanism 2 to applied position upon actuation of a spring biased valve mechanism 8 connected between a pneumatic suspension unit 9 on the vehicle and the brake motor 7 by lines 10 and 11. More particularly, the motor 7 is fixed to a stationary portion of the vehicle indicated at 12 and comprises a diaphragm 13 dividing the motor into a pressure chamber 14 connected to line 11 and a breather chamber 15. A push rod 16 connected to the diaphragm 13 is provided with a flange 17 to engage and swing the arm 6 in a downward direction as viewed in FIG. 1 when fluid under pressure is supplied to chamber 14. The cable 6b is provided with a lost motion connection including a part 18 slidable in one direction relative to the arm 6 to permit it to swing downwardly independently of the hand brake handle 6a and cable 6b. A spring 19 is provided in the chamber 15 to return the diaphragm 13 and the rod 17 to a released position upon exhaust of fluid pressure in the pressure chamber 14 so that the brake shoes 5 may be released from the drum 3.

In the released position of the valve 8 as shown in FIG. 1, communication between the pneumatic unit 9 and pressure chamber 14 of the motor 7 is interrupted by a normally closed spring biased inlet valve element 20 having a resilient sealing insert 20a seating on a lip type seat 21 formed in the valve body. Under these conditions the chamber 14 is in communication with the atmosphere through a chamber 22 of the valve body, a longitudinal passage 23a in a plunger 23, radial passages 24 in the plunger and an atmospheric port 25 in the valve body. Upon overtravel of the brake pedal 1, as a result of failure in the service brake system, the pedal 1 engages and moves the plunger 23 to the left as viewed in FIG. 1 against the bias of a return spring 26 to first seat an open end 23b of plunger 23 on the insert 20a of valve 20 to interrupt the exhaust of air from the chamber 14. Further movement of the plunger 23 is effective to move valve 20 from the seat 21 to admit fluid under pressure from pneumatic unit 9 to working chamber 14 of motor 7 to apply the brake mechanism 2. Suitable annular seals 28 and 29 are provided in the valve body to prevent the passage of air between the plunger 23 and the valve body. It will be understood that the pneumatic suspension unit 9 is supplied from a source of fluid under pressure on the vehicle, as for example, from a pneumatic suspension reservoir indicated at D in FIG. 2 through the line 30 and forming part of the pneumatic suspension system of the vehicle. Hence, the provision of the fluid motor 7 and valve 8 forms a simple inexpensive and independent power brake system for the vehicle considerably more effective than the conventional manually applied emergency brake.

Figure 2:
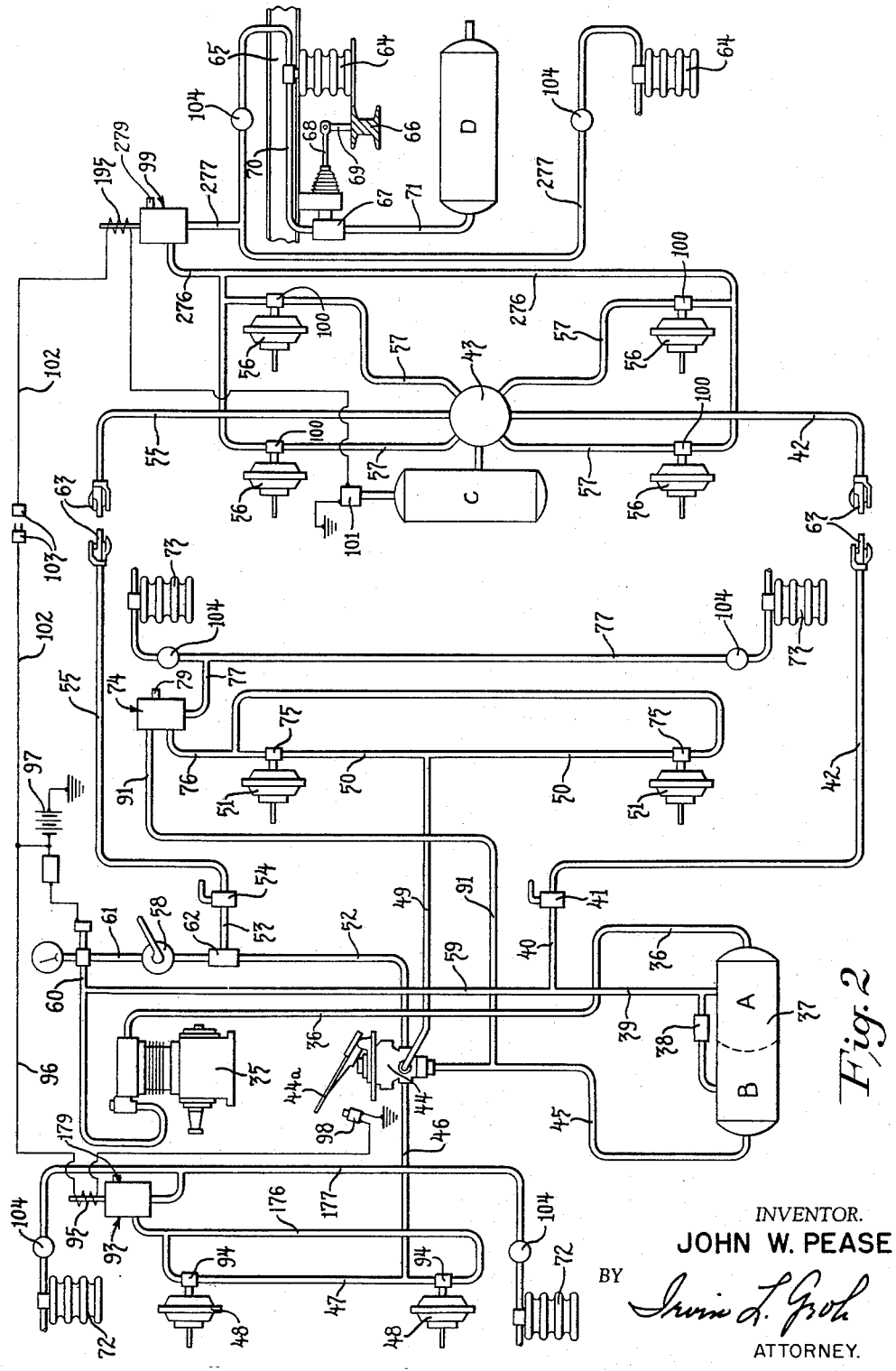
FIG. 2 is a diagrammatic view of a truck and trailer service brake and suspension system incorporating the invention.

Referring to FIG. 2, the invention is shown embodied in an arrangement for tractors and trailers including a service brake system of conventional design and a pneumatic suspension system controlled automatically as described in the copending application of Forrest O. E. Schultz and John R. Almond dated July 2, 1956 and assigned Serial Number 595,475. No claim is made herein to the above mentioned service brake system or the pneumatic suspension system per se, the two being shown for a better understanding of the invention.

The tractor-trailer service brake system shown in FIG. 2 includes a conventional compressor 35 mounted on the tractor and driven by any suitable means such as a gasoline engine (not shown) to supply fluid under pressure through a line 36 to reservoir A of a double reservoir tank 37 and from reservoir A to reservoir B of the same tank through a one-way check valve 38. Reservoir A is associated with the trailer portion of the brake system and supplies fluid under pressure to a trailer mounted reservoir C through lines 39 and 40, shut-off cock 41, emergency line 42 and a conventional emergency relay valve 43. Reservoir B is associated with the tractor brake system and supplies fluid under pressure to a conventional service-brake foot-valve 44 through a line 45 for distribution by lines 46 and 47 to brake actuating fluid motors 48 associated with the front axle of the truck and by lines 49 and 50 to brake actuating fluid motors 51 associated with the rear axle of the truck. Foot valve 44 also supplies fluid under pressure through lines 52 and 53, shut-off cock 54 and service line 55 to actuate the emergency relay valve 43. The emergency relay valve 43 is adapted to pass fluid under pressure from the emergency line 42 to the reservoir C and upon receiving fluid under pressure from service line 55 to pass fluid under pressure from tank C to tractor brake actuating motors 56 through lines 57 connected to the relay valve 43. The relay valve 43 is also adapted to pass fluid under pressure from reservoir C to the brake actuating motors 56 upon loss of fluid pressure in the emergency line 42. In addition to the foot operated valve 44 for supplying fluid under pressure to the service line 55 from the reservoir B, the service brake system is provided with a hand operated valve 58 connected between the reservoir A and service line 55 by lines 59, 60 and 61 and double acting check valve 62. The hand valve 58 acts as an alternate means for applying the trailer brakes. The usual gladhand detachable connections 63 are provided for disconnecting the tractor and trailer service and emergency lines.

The pneumatic suspension system shown in FIG. 2 associated with the trailer includes pneumatic suspension units 64 for supporting a sprung portion 65 of the trailer on an unsprung portion 66 thereof. Fluid under pressure is supplied to and exhausted from the units 64 in accordance with the load on the trailer, to maintain a desired spaced relation of the sprung and unsprung portions of the trailer, by way of control mechanism including a valve 67 mounted on the sprung portion 65 and height control mechanism including pivoted arms 68 and 69 connected to the valve 67 and the unsprung portion 66 of the trailer. This pneumatic suspension control mechanism is fully described in the copending application Serial Number 595,475 previously mentioned.

Briefly, the supply and exhaust of air to and from the units 64 is controlled by the valve 67 disposed in line 70. Valve 67 is actuated by upward and downward swinging of the arm 68 when the load on the vehicle changes. Any suitable pressure source may be employed to supply the valve 67 through a line indicated at 71. Such a source may be a pneumatic suspension reservoir D supplied by a compressor (not shown).

The tractor is also equipped with a pneumatic suspension system including control valves and height control means for controlling fluid pressure in the suspension system in accordance with load on the vehicle to maintain a desired spaced relation of the sprung and unsprung portions of the tractor. To avoid complicating the drawing, only the pneumatic suspension units 72 and 73 are shown.

If a fault should occur in the conventional service brake system on the tractor, for example in the reservoir B, or any of the lines 45, 46, 47, 49, 50 and 53 or in any of the fluid pressure motors 48 and 51, the complete service brake system on the tractor becomes inoperative. If the tractor is connected to the trailer the trailer brakes may be used by operation of the hand valve 58 to bring both vehicles to a stop. If the tractor is not connected to the trailer brakes are not available on the tractor except through a hand emergency brake (not shown) which is not a satisfactory brake means for a vehicle in motion or on a steep grade.

It is possible to provide an additional emergency relay valve of the type indicated at 43 and an additional reservoir on the tractor to protect the brake chambers 51 associated with the rear axle of the tractor for emergency braking. However, such an addition is expensive and space consuming. Moreover, rear axle braking becomes less effective when the vehicle is headed downhill on a steep incline in that the weight of the vehicle is shifted to the front axle. Application of such automatic brake means to the front axle is not practical in that it is not under driver control and interferes with steering of the vehicle.

In accordance with one aspect of the invention provision is made for relatively simple and reliable means, economical as to both cost and space requirements, for automatic emergency braking on the rear axle of the truck in response to a reduction in pressure in the reservoir B below a predetermined safe operating pressure. This is accomplished by means of a fluid pressure responsive valve 74, conventional double acting check valves 75 and conduit means for interconnecting the valves 74 and 75 between the reservoir B, pneumatic units 73 and brake motors 51 as will be presently described.

The fluid pressure responsive relay 74 may be of any suitable type capable of passing fluid under pressure from an inlet to a delivery port in one position of the valve elements and for releasing fluid under pressure from the delivery port to the atmosphere in another position of the valve elements, both movements being responsive to fluid pressure at a control port of the relay. The relay 74 shown in FIG. 3 includes an inlet port 77a, delivery port 76a, and valve means 81 having a resilient face 81a spring biased against an annular lip type seat 82 to interrupt communication between the inlet and delivery port. An integral piston 83 and valve actuating rod 84 is slidable on concentric surfaces of the valve body 78 and the rod 84 is centrally recessed at 85 and radially recessed at 86 to pass fluid under pressure from the delivery port 76a to the exhaust port 79a. An annular valve seat 84a is formed at the open end of the rod 84 to interrupt communication between the delivery and exhaust ports upon engagement of the rod 84 with the resilient surface 81a of the intake valve 81. The piston 83, rod 84 and body 78 define a control chamber 90 communicating with the control port 91a. Sealing means 87, 88, and 89 are provided to prevent the passage of fluid under pressure between the valve body and the piston 83 or rod 84. A spring 92 is provided to urge the piston 83 and valve actuating rod 84 downward as viewed in FIG. 3.

Figure 3:
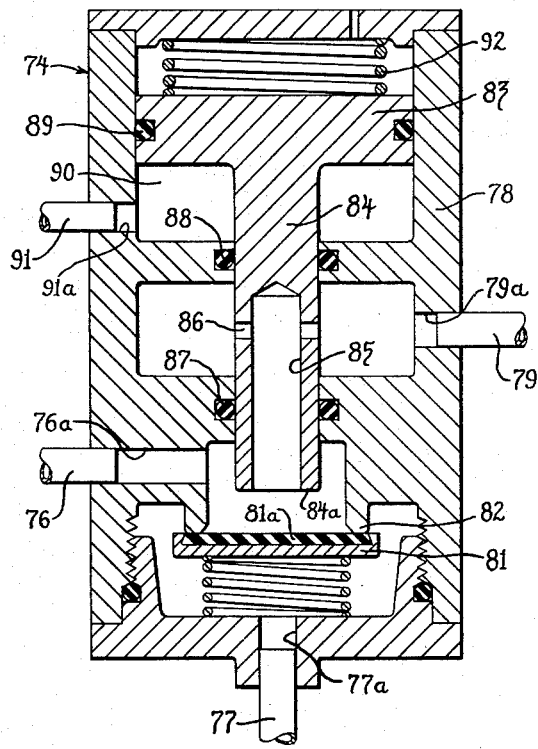
FIG. 3 is an enlarged cross-sectional view of a pneumatic suspension valve diagrammatically illustrated in FIG. 2.

Referring to FIGS. 2 and 3, the pneumatic units 73 are connected by lines 77 to the inlet port 77a of the relay to supply fluid under pressure thereto. The delivery port 76a of relay 74 is connected to one side of each of the check valves 75 as a source of fluid under pressure alternate to line 50 of the service brake system connected to the other side of each of the check valves 75. Actuation of the relay 74 responsive to drop in fluid pressure of the reservoir B is obtained by connecting a line 91 providing communication between the control chamber 90 and the reservoir B. Thus, under normal operation of the service brake system fluid under pressure is supplied to the brake motors 51 from line 50 through double acting check valves 75 and the valve 74 is maintained in its released position as shown in FIG. 3 by fluid pressure in reservoir B acting on piston 83 in opposition to the bias of spring 92 so that line 76 is in communication with the atmosphere. However, upon a fault in the service brake system lowering the fluid pressure in reservoir B below a safe operating pressure, the spring 92 of valve 74 overcomes the fluid pressure in control chamber 90 to close the exhaust valve 84a and open inlet valve 81 to actuate the fluid motors 51 from fluid pressure in the pneumatic units 73.

Figure 4:
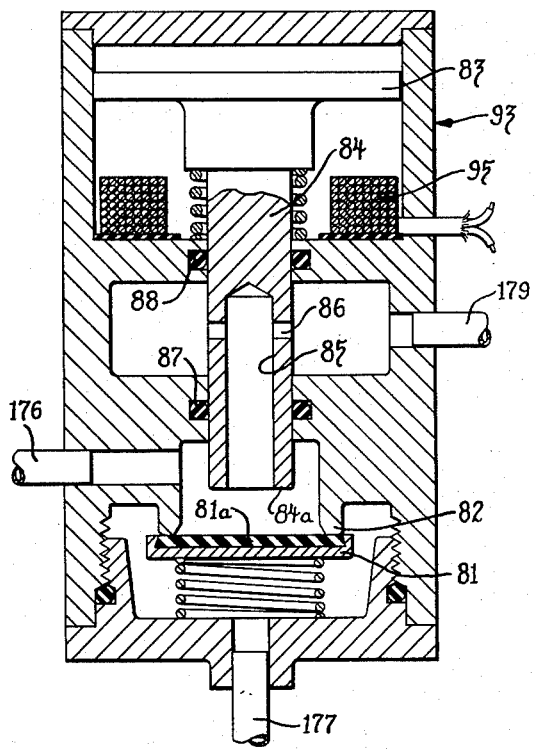
FIG. 4 is an enlarged cross-sectional view of an electro-pneumatic valve shown diagrammatically in FIG. 2.

To operate the brake motors 48 associated with the front axle of the tractor upon the occurrence of a fault in the service brake system provision is made for a valve 93 and double acting check valves 94 connected by lines 176 and 177 between the motors 48 and suspension units 72 in the same manner as described for the connection of valve 74 and double acting check valves 75 between the motors 51 and pneumatic units 73. The valves 74 and 93 are identical in structure and operation except that valve 93 as shown in FIGS. 2 and 4 is operated by a solenoid 95 to applied position. The solenoid 95 is electrically connected by line 96 to the vehicle battery 97 and to a manually operated switch 98, the switch being positioned in the path of travel of the pedal 44a of the foot valve 44 so that overtravel of the foot pedal 44a is effective to operate a switch 98 to energize the solenoid 95 and actuate the valve 93 to supply fluid under pressure from the pneumatic units 72 to the brake motors 48. The reason for providing a pedal operable means for applying emergency braking to the motors associated with the front axle is to maintain braking on the front axle under control of the driver since braking on the front axle, under some circumstances, may interfere with steering of the vehicle.

For any fault in the service brake system on the tractor short of a diaphragm failure of one of the fluid motors, power brake protection is provided for both axles. In the event of a diaphragm failure, power brake protection is still provided for one axle of the truck.

Referring now to the trailer service brake system, a failure in the service line 55 and operation of the foot valve 44 or the hand valve 58 will exhaust pressure from reservoir A and the emergency line 42 to set the valve 43 for emergency application of the brake motors 56 in response to pressure in reservoir C. Also, failure of the emergency line 42 will set the relay 43 for emergency braking on the fluid motors 56. However, failure of any of the brake chamber lines 57 or of the reservoir C results in loss of braking for the axle or axles associated with the reservoir C.

In the trailer emergency system there is provided a valve 99, identical in structure and operation to the valve 93. The valve 99 is connected by means of double acting check valves 100 and lines 276 and 277 between the fluid motors 56 and trailer suspension units 64 in the same manner that the valve 93 is associated with the fluid motors 48 and pneumatic units 72. However, the solenoid 195 of the valve 99 is connected to a pressure responsive electrical switch 101 and to a trailer mounted portion of an electrical line 102 supplying electrical current to the trailer for lights, the line 102 being provided with a coupling 103 for separating the tractor and trailer portions of the line upon disconnection of the trailer from the tractor. The pressure responsive switch 101 is pneumatically connected to the reservoir C for bias to open position at pressure above a predetermined safe brake operating pressure. Upon drop in pressure in reservoir C below a predetermined value, the switch 101 is allowed to close to energize the solenoid 195 and supply fluid under pressure from the pneumatic suspension units 64 to the fluid motors 56 to apply the trailer brake in emergency.

The reason for providing the particular electrical circuit described above is to automatically render inoperative the functioning of the tractor emergency brake system upon disconnection of the trailer from the tractor to thereby avoid a possible loss of fluid pressure in the pneumatic units. More particularly, if the trailer is disconnected from the tractor, loss of pressure in the disconnected emergency line 42 sets the trailer brakes under fluid pressure derived from the reservoir C. However, should the trailer remain parked a sufficient length of time the reservoir C may gradually lose its fluid pressure to a point where the solenoid 195 would be operated to connect the pneumatic units 64 to the fluid motors 56 and thereby also exhaust fluid pressure in the pneumatic suspension units and their supply reservoir D. This is not desirable in that the vehicle is likely to require loading prior to reconnection to the tractor and automatic leveling could not take place. However, since the electrical line 102 is also disconnected at 103 when the trailer is detached, the solenoid 195 is deprived of its source of electrical energy and regardless of drop in pressure in the reservoir C the pneumatic units 64 will remain isolated from the brake motors 56.

The one-way check valves 104 which are provided in the lines 77, 177 and 277 adjacent the respective pneumatic units 72, 73 and 64 permit passage of fluid under pressure from the units to their associated valves but prevents the transfer of fluid under pressure between pneumatic units at opposite sides of the vehicle so that tilting of the vehicle under load is avoided.

In FIG. 2 pairs of brake motors are connected through a common relay valve means to associated pneumatic suspension units. It is to be understood that each brake motor could be connected by a separate valve to an associated pneumatic suspension unit so that failure of a diaphragm in a fluid motor would result in only one brake rather than a pair of brakes being inoperative.

From the above it is believed evident that a relatively simple power emergency brake system has been provided which is adapted to cooperate with existing service brake and pneumatic suspension systems on vehicles without requiring modification. It should be noted also that in the improved power emergency brake system the available braking effort is proportional to the load so that the more heavily the vehicle is loaded the greater the available power. Furthermore, each of the pneumatic units is a separate independent source of fluid under pressure for the emergency system which contributes to safety. Although an additional reservoir can be added to a vehicle as a source of fluid under pressure for emergency braking, additional signal devices are required to warn of a failure affecting the source. Such devices are sometimes inoperative or disregarded by a careless driver. However, a driver is not likely to drive a vehicle with the pneumatic suspension units deflated in the same sense that he is not likely to drive a vehicle with flat tires.

It should be understood that in each of the brake arrangements described above, the emergency valves 8, 74, 93 and 99 can be connected to the pneumatic suspension reservoir of the suspension system, as for example reservoir D, rather than to the pneumatic suspension units. In doing so certain of the advantages mentioned above will be lost. However, there remains a very simple, reliable and novel power emergency braking system readily adapted for cooperation with present service brake systems on vehicles having a source of fluid under pressure normally used for devices other than the brake system.

It should be understood that it is not intended to limit the invention to the above described forms and details, and that the invention includes such other forms and modifications as are embraced by the scope of the appended claims.

It is claimed and desired to secure by Letters Patent:

1. In a vehicle having a pneumatic suspension means for supporting a sprung portion of said vehicle, brake means for said vehicle comprising a source of fluid pressure and a fluid pressure responsive motor for operating brake mechanism on said vehicle, valve means connected to said pneumatic suspension means and to said fluid motor, said valve means being operable in one position to provide communication between said suspension means and said motor to apply said brake mechanism and operable in a second position to interrupt said communication and release fluid pressure from said fluid motor to release said brake mechanism, and means responsive to fluid pressure in said brake means above a predetermined minimum for operating said valve means from said first to said second position.

2. In a vehicle having a pneumatic service brake system including a fluid pressure responsive motor for actuating brake mechanism on the vehicle and manually actuated valve means connected between a source of fluid pressure on said vehicle and said motor to control the operation of said motor, together with a pneumatic suspension system for supporting a sprung portion of said vehicle, emergency brake means for said vehicle comprising a second valve means connected to said suspension system and to said fluid motor, said valve means being operable to one position to pass fluid under pressure from said suspension system to said fluid motor and to a second position to interrupt communication between said suspension system and motor and exaust fluid pressure from said motor, means for operating said second valve between said positions in response to failure of pressure at said source of fluid pressure, and double acting check valve means connected between said first and second valve means and said motor to maintain said first and second valve means as alternate sources of fluid under pressure for operating said motor.

3. In a trailer having a fluid pressure brake system including a fluid pressure motor responsive for actuating brake mechanism, a reservoir on the trailer for supplying fluid pressure to the motor, and means for detachably coupling the trailer brake system to a source of fluid under pressure on a towing vehicle, together with an electrical circuit on the trailer adapted for detachable coupling to an electrical system on the towing vehicle as a source of electrical energy, and a pneumatic suspension system including a pneumatic suspension unit on the trailer for supporting a sprung portion thereof, the improvement comprising a double acting check valve connected to said motor to pass fluid under pressure thereto and connected to said pneumatic suspension unit and to said brake system as alternate sources of fluid under pressure for said motor, a solenoid valve means operable to one position to provide communication between said pneumatic unit and said motor to apply the trailer brake mechanism and to a second position to isolate said suspension system from said brake system and exhausting fluid under pressure from said motor to release the trailer brake mechanism, said solenoid being connected to said electric circuit, and a fluid pressure responsive switch connected to the trailer reservoir and to said solenoid to operate said solenoid valve to said one position responsive to a loss in fluid pressure in said reservoir below a predetermined value.

4. For a vehicle having a pneumatic suspension system and a pneumatic service brake system including fluid responsive brake motors associated with the steering axle of the vehicle, a service brake source of fluid under pressure and a foot pedal operated valve for actuating the motors from said source, an improved emergency brake system comprising an electro-pneumatic relay pneumatically connected between said pneumatic suspension system and said motors and electrically connected between a source of electrical energy on the vehicle and a grounding switch, double acting check valve means providing communication to said motors from said relay and service brake system in the alternative, said relay including a normally closed inlet valve to interrupt communication between said suspension system and said check valve means and a normally open exhaust valve to vent said check valve means to the atmosphere, said grounding switch being positioned in the path of said foot pedal to electrically energize said relay automatically on overtravel of said pedal whereupon said valves are reversed to apply under driver control power emergency braking on said motors.

5. In a vehicle having a service brake system including a source of fluid under pressure and a brake actuating fluid motor normally deriving power from said source through manually operable valve means, a pneumatic suspension unit supporting a sprung portion of the vehicle, a control valve having a first operative position in which said suspension unit and motor are in communication with each other and a second operative position in which said unit and motor are isolated from each other, means in said control valve responsive to pressure in said source above a predetermined minimum to maintain said control valve in said second position and below a predetermined minimum to move said valve to said first position to deliver fluid to said motors for applying said brakes, and double acting check valve means for delivering fluid under pressure to said motor alternately from said source and suspension units.

6. In a vehicle having a service brake system including a reservoir and a brake actuating fluid motor normally deriving power from said reservoir through manually operable valve means, a pneumatic suspension unit supporting a sprung portion of the vehicle, a double acting check valve for supplying fluid pressure to said motor from alternate sources, one of said sources being said reservoir, a control valve connected to said unit and through one side of said double acting check valve to said motor, the other side of said check valve being connected to said valve means and reservoir, said control valve being disposed in a first position to provide communication between said unit and motor for actuating the latter and movable to a second position to interrupt said communication and exhaust fluid pressure from said motor, and means for moving said control valve from said second to said first position in response to a drop in fluid pressure in said reservoir below a predetermined minimum.

References Cited in the file of this patent

UNITED STATES PATENTS

| | | |
|---|---|---|
| 1,694,951 | Reynolds | Dec. 11, 1928 |
| 1,922,227 | Brecht | Aug. 15, 1933 |
| 2,240,166 | Stanley | Apr. 29, 1941 |
| 2,512,043 | Stevens | June 20, 1950 |
| 2,539,538 | Hayes | Jan. 30, 1951 |
| 2,781,870 | Clements | Feb. 19, 1957 |
| 2,843,227 | Williams | July 15, 1958 |
| 2,891,818 | Siano et al. | June 23, 1959 |